United States Patent Office

2,827,441
Patented Mar. 18, 1958

2,827,441

STABLE CATALYZED AMINE-MODIFIED UREA-FORMALDEHYDE RESIN COMPOSITIONS CONTAINING MONOHYDRIC ALCOHOL AND EXCESS FORMALDEHYDE, AND METHODS OF PRODUCING SUCH COMPOSITIONS

Edward J. Romatowski, Maumee, Ohio, assignor, by mesne assignments, to Allied Chemical & Dye Corporation, New York, N. Y., a corporation of New York No Drawing. Application May 11, 1953
Serial No. 354,389

11 Claims. (Cl. 260—29.4)

This invention relates generally to urea resin solutions and more specifically to aqueous, catalyzed solutions of urea-formaldehyde resins for use as adhesives and coating compounds.

Urea-formaldehyde resins are widely used as adhesives, especially in plywood manufacture, fiber board manufacture, paper lamination, etc. They have the desirable properties of being water-soluble before cure and highly water-resistant after cure. It has been conventional to market these adhesives as uncatalyzed aqueous solutions containing about 45 to 65% resin solids, the consumer adding catalyst, fillers, plasticizers, and other ingredients just before use. These same resins also have been extensively marketed as spray-dried powders which the user dissolves in water and then adds the catalyst and other ingredients of the final adhesive. However, in both instances the user must exercise considerable skill in formulating in order to produce a satisfactory adhesive. When so made the adhesives have a liquid life of only from a few hours to several days. Finally, even though extensively formulated with plasticizers, fillers, etc., these resins have poor tack and do not cure sufficiently fast at room temperatures to adapt them for use as assembly glues. Clamp time is unduly long, and the adhesive layer requires a considerable time to acquire its full strength.

It is the principal object of this invention, therefore, to provide aqueous urea-formaldehyde resin solutions which are of greatly increased stability in the catalyzed state, have sufficient tack, and which are sufficiently rapid curing to permit their use as cold press or assembly glues and as water-base paints, lacquers, varnishes and filler or sizing compositions. Still other objects will become apparent in the description which is to follow.

I have discovered that a particular type of amine-modified urea-formaldehyde resin produces stable, catalyzed adhesive, varnish, or water-base paint compositions when an aqueous solution of such a resin is a highly-condensed state is stabilized with additions of specified proportions of a water-soluble aliphatic alcohol and of formaldehyde. The resulting stabilized solution may be catalyzed by adding an acidic material and utilized directly to deposit a fast curing, very strong resin coating, sufficient acidic material being added to produce a pH below 4.5. Freshly deposited coatings of this type exhibit considerable tack so that assembly of, for example, pieces or plies of wood, paper, fabric and other laminates can be pressed together under moderate pressure and the pressure removed in a short time to produce a well-glued or laminated structure of great strength.

The use of methanol to stabilize uncatalyzed aqueous solutions of ordinary unmodified urea-formaldehyde resins is well known. However, large quantities of methanol are required for this purpose, for example, up to 100% by weight or more based on the resin. In fact, urea resins are truly stable only in substantially pure alcohol in which case it is believed that the methylol end groups of the resin are more or less methylated. Concentrated alcohol solutions of urea resins, moreover, are too thin for use as adhesives and coating resins and are stable only for one or two months at best. The latter solutions become useless as adhesives, long before gelation, because of a pH rise which interferes with fast cure. If the pH is lowered for better cure, depolymerization of the resin occurs with even further decreases in solution viscosity. Methanol or other alcohols used alone have very little effect on the liquid life of catalyzed aqueous urea adhesive or coating compositions.

Likewise formaldehyde is known to have a stabilizing action on uncatalyzed urea glue solutions. However, the resulting glues, even those containing more than 50% by weight based on the resin of excess formaldehyde, are stable for only one or two months and are obviously unsuitable as commercial products. The cure properties of the glue are adversely affected during relatively short storage periods. The water resistance of the cured glue layer is adversely affected by excess formaldehyde. Excess formaldehyde, moreover, has relatively little effect on the liquid life of catalyzed urea glue or coating solutions.

It is believed that the stable solutions of this invention represent an equilibrium in which depolymerization and polymerization offset one another and in which various other factors are balanced to prevent change in solution pH and viscosity. When the resin concentration, alcohol concentration, formaldehyde concentration, or the pH are changed within limits (such as by addition of any of these reagents to increase the concentration, by the addition of water to decrease their concentration, or by the addition of acid or base to alter the pH) a new equilibrium is soon established with the production of a stable solution. Hence, when the stabilized solution is spread out in a thin film, alcohol, excess formaldehyde and water evaporate such that the composition of the film progressively changes until the resin ultimately cures to the infusible, thermoset condition. This is believed to be the reason for the tacky condition of the film when freshly deposited and also the reason for the otherwise rapid-curing resin permitting a satisfactory assembly time.

However, as with most such equilibriated systems, the stable, equilibrium conditions are obtained only within certain specified limits of pH and alcohol and formaldehyde concentration. Less than 5% by weight of an alcohol such as methanol based on the total weight of solution does not produce a stable solution. The use of more than 60% alcohol causes the catalyzed solution viscosity to decrease during storage, probably because of depolymerization. The use of less than 15% based on the total weight of resin of excess formaldehyde fails to stabilize the solution while the use of more than 40% has no further effect on stability and, moreover, causes undesirable reduction in viscosity of the solution, unpredictable cure rate and poor water-resistance in the deposited resin.

The effect of pH is also somewhat complex and is somewhat related to the methanol and formaldehyde content. Within the above limits, however, a fast curing resin is obtained when the pH of the stabilized, catalyzed solution is below 4.5. Above a pH of 4.5, the shear strength of a plywood laminate, for example, is very low and the resin layer is extremely slow to reach its maximum strength. As the pH is lowered the shear strength and cure rate are greatly increased, until at a pH below about 1.4 solution instability is reached due to resin depolymerization and/or precipitation. It is preferred that the solution pH be maintained in the range of 1.5 to 3.5. Best results are obtained in the range of 2.0 to 2.8.

As pointed out above, the resin should be of a high degree of condensation, as high as is commensurate with water-solubility and water-dilutibility. The reason for this is that after addition of alcohol and formaldehyde and also acid or catalyst, the solution viscosity undergoes a slight reduction during a period of equilibration and readjustment. Thus, in order to obtain a final stabilized and catalyzed solution of a suitable viscosity for the desired use, it is desirable to start with a high viscosity resin solution. Of course, a stabilized, catalyzed solution which is too thin for use as such can be filled, extended or thickened by the use of carboxymethyl cellulose, methyl cellulose, wheat flour, polysaccharides, casein, protein, and the like. It has been found, however, that a basic resin solution (unstabilized and uncatalyzed) of the invention, made to 48% solids content, is usable if its final solution viscosity is S–$Z_3$ (Gardner-Holdt @ 25° C.). This viscosity range is equivalent to a standard poise viscosity range of from 5.0 to 46.30 also at 25° C. Such a solution "slides back" after stabilization and addition of the acidic catalyst to a viscosity of B or above on the Gardner-Holdt scale (0.65 poises or above). Slightly less viscous solutions can be utilized, however, if the final application will permit the use of thickening agents to bring the final solution viscosity back into the usable range. It is preferred, therefore, that the basic resin solution have a viscosity equivalent to S–$Z_3$ for a 48% solids content. Better results are obtained using a viscosity of W–$Z_3$.

The alcohols useful in this invention are aliphatic alcohols having a solubility in water within the specified range. Methanol, ethanol, n-propanol, 2-butanol and others may also be used. Methanol and ethanol are preferred because of their low cost, ready availability and greater volatility.

The urea-formaldehyde resin useful in this invention is modified by reaction in the presence of a water-soluble amine or amine salt. Suitable amines for this purpose include ammonia, the lower alkyl water-soluble amines, the alkanol amines (hydroxyalkyl ammonium hydroxides) such as ethanol amine, triethanolamine and others, the ethylene polyamines such as ethylene diamine, diethylene triamine and others, hydrazine, and others. Other amines which are only sparingly soluble and produce amine-modified urea resins of sparing solubility may also be utilized providing the resin is reacted or treated with another solubilizing agent such as one of the water-soluble amines, glycollic acid and others. An example of the latter type of amine is a non-aliphatic amine such as aniline, N,N-bis(2-hydroxyethyl) piperazine, and others. The preferred amine modifiers are the polyalkylene polyamines such as the polymethylene amines, polyethylene amines, and polypropylene amines, and others containing up to five alkylene groups. The latter are preferred because of their flexibilizing effect on the urea resin. Best results are obtained by the use of the ethylene polyamines containing up to five ethylene groups such as ethylene diamine, diethylene triamine, triethylene tetramine, tetraethylene pentamine and others.

The urea resin may be amine modified by reacting an intermediate, water-soluble urea-formaldehyde condensate in the presence of an amine or its salt or the amine may be added to the original urea-formaldehyde reaction mixture in any of a number of ways. For example, a preferred procedure is to add formaldehyde and the amine to the condensation vessel along with sufficient acid to produce a pH of 7.0 to 7.2 to form an amine salt and/or a complex addition compound of methylene glycol and the amine salt, the urea then added and the condensation continued at a temperature between 70° C. and the boiling point of the mixture until a viscosity of L–M Gardner-Holdt is reached, after which the reaction mixture may be cooled to 55 to 75° C. to allow the last stages of condensation to proceed in a slower and more controllable manner. A preferred procedure for the amine-modification of a preformed, urea-aldehyde intermediate condensate is described with greater detail in the copending application of the present applicant and John B. Davidson, S. N. 262,192, filed December 17, 1951, and issued July 6, 1954, as U. S. Patent No. 2,683,134.

The proportion of amine or amine salt utilized in the production of the amine-modified urea-formaldehyde resin will vary somewhat depending on the particular amine employed. In general from 0.01 to 0.30 mol of amine or amine salt per mol of urea in the resin will be found sufficient. With the lower alkyl amines such as the methyl and ethyl amines it is preferred to utilize 0.05 to 0.25 mol per mol of urea, most preferred being 0.15 to 0.20. With the more efficient amine modifiers such as the ethylene polyamines and the alkanol amines only 0.01 to 0.20 mol/mol of urea is required, with a preferred range being 0.05 to 0.15 mol/mol of urea. Best results with the polyethylene polyamines are obtained using 0.1 mol/mol of urea.

The proportions of urea and formaldehyde which are reacted to form the resin may be varied somewhat, within limits, depending on the characteristics desired in the final resin and also to some extent on the degree of amine-modification. In general the molar ratio (F/U) of formaldehyde to urea is between 1.5:1 to 2.5:1, more preferably 1.8:1 to 2.25:1, and most preferred 2:1. A small amount of additional formaldehyde is utilized corresponding to that believed to react with the amine modifier. For this purpose, formaldehyde, in an amount approximating, on a mol for mol basis, the mols of active amino-hydrogen in the amine modifier (in addition to the above-mentioned molar ratios) is added either to the original reaction mixture or concurrently with the amine addition. Thus for every mol of diethylene triamine used as a modifier, the total formaldehyde content of the reaction mixture is increased by about five mols in order to completely react the amine. For a 2:1 urea resin modified with 0.1 mol of diethylene triamine, this means that the total formaldehyde utilized then will be 2.5 mols. For amine modifiers such as triethanolamine which do not contain active amino-hydrogen no additional formaldehyde is required.

The resin solution can be made to any solids content. Generally, however, solutions containing less than 35% solids are too thin for practical use, while those containing over 75% solids are too viscous for easy handling. It is most convenient to use solutions containing from 40 to 70% total solids.

The condensation reaction may be carried out at atmospheric or superatmospheric pressures, as desired.

The condensation reaction, with or without the amine-modifier is preferably carried out in two stages. The first stage is carried out under neutral or slightly alkaline conditions to produce a water-soluble intermediate product believed to be composed essentially of dimethylol urea. The second stage condensation is carried out under slightly acid conditions, that is, at a pH above 4 and below 7.0. The condensation reaction is undesirably slow, however, at a pH above 6.0. It is preferred to carry out the second stage at a pH between 4.0 and 5.6, more preferably between 4.2 and 5.2. At the conclusion of the second stage condensation the resin solution (amine-modified) is mixed with an alcohol such as methanol and formaldehyde to stabilize it. The pH is then adjusted by the addition of an acidic substance, preferably a strong acid, to a value between 1.4 and 4.5 in which condition it is catalyzed and ready to cure upon evaporation of the alcohol and formaldehyde. The result is a stable, catalyzed urea resin solution useful as an assembly glue or a coating composition. For the latter use, a small amount of polyhydric alcohol such as ethylene glycol or glycerine or a water-soluble fatty acid glyceride, or other plasticizers may be added to prevent cracking and crazing. As an adhesive, a thickening agent such as wheat flour may be added, if desired, before use.

The adhesive or coating solution of this invention does not require any of the conventional glue hardeners to produce a readily curable adhesive coating or surface coating. The conventional urea-formaldehyde resins are catalyzed by the addition of salt-type hardeners such as ammonium chloride, ammonium bromide, ammonium sulfate, ammonium oxalate, alum and others which hydrolyze in water and thereby lower the pH to the range causing rapid condensation. Since the solutions of this invention are stable down to a pH as low as 1.4 or lower, the catalyst may be any acid such as formic acid, hydrochloric acid, hydrobromic acid, sulfuric acid, chloracetic acid, oxalic acid, and others. Compounds such as alum or any of the strongly acidic salts of a weak base and a strong acid or, if desired, a mixture of such a salt and an acid may be utilized.

Solutions of this invention which are stabilized at a pH between 1.4 to 4.5 cure so rapidly that a plywood laminate may be sanded and subjected to light machine work after about 50 minutes of clamp time. By contrast, plywood laminated with ordinary urea glues require a clamp time of several hours and are not safely worked until at least six hours after assembly. In mass production industries such as plywood manufacture and furniture manufacture the advantages of the rapid curing properties, and long "pot-life" of the solutions of this invention are incalculable. Added to these advantages is the excellent tack of the freshly deposited film which makes assembly so much easier. The only satisfactory assembly glues heretofore available have been based on vinyl resins such as modified polyvinyl acetates. Compared to the latter, the urea adhesives of this invention are from 2 to 5 times stronger under shear.

As coating compositions, the solutions of the present invention are unsurpassed for use in water-base paints, varnishes, lacquers, and filler and sealer compositions. The solutions of this invention can be ground with pigments to form thick paste-like compositions requiring dilution only with water to a suitable consistency before application. Formerly known aqueous urea resin solutions had to be supplied in the uncatalyzed state because of their poor catalyzed liquid life. Furthermore, such solutions formed brittle coatings because of cracking and crazing. Waterbase paints of this invention are tightly adherent, flexible, and highly resistant to washing. They exude very little odor and dry in as little as 5 to 15 minutes to a print-free coating. In several hours at room temperature they cure to a water-impervious coating.

As clear coatings, the solutions of this invention, when suitably plasticized, deposit hard, glossy coatings which are resistant to water, alcohols, solvents, and oils. A dilute solution is superior to ordinary shellac and lacquers as a wood primer or sealer since the final coating is more moisture-, alcohol- and solvent-resistant.

The invention will now be more fully described in the following specific examples demonstrating the preparation and properties of several solutions of the invention, their uses and properties. The examples, however, are intended to be merely illustrative.

*Example 1*

A charge of 1475 grams of 51% aqueous formaldehyde is placed in a flask and cooled to 40° C. Diethylene triamine, 104 grams, is then added while cooling strongly to control the strongly exothermic nature of the reaction. Concentrated hydrochloric acid (36.5%) is then added to adjust the pH to 7.0 to 7.2. Urea, 600 grams, is added and the mixture heated to 95° C. The pH is then adjusted to 4.6 with formic acid. The condensation is continued at 95° C. with periodic addition of formic acid to maintain the pH in the range of 4.6 to 5.0. When the solution viscosity is L-M Gardner-Holdt the temperature is dropped to 55° C. The reaction mixture is held at 55 to 60° C. until a viscosity of Y–Z is reached. The reaction mixture is then cooled to 50° C. or below. Methanol, 218 grams, is then added and cooling continued to 30° C. when 218 grams of 51% formaldehyde solution are added. Finally, 100 ml. of water are added to bring the viscosity into the O–R range, Gardner-Holdt.

The above solution is then divided into three equal parts. To part A there is added sufficient 51% formaldehyde solution to make 15% excess formaldehyde on the total weight of resin. To part B there is added sufficient 51% formaldehyde solution to total 20% excess formaldehyde. Part C is the original solution containing only 7.5% excess formaldehyde. The three samples are catalyzed with various amounts of acids or alum, so as to adjust the pH at various levels between 4.8 and 3.0. The resulting samples are then tested for use in assembly gluing by the preparation of shearing blocks. The shear strengths of duplicate blocks are determined, two and four days after assembly, to demonstrate the rate of cure and the effect of pH (or catalyst level) on shear strength. The results are as follows:

| Sample No. | Percent $CH_2O$ | Catalyst Agent | pH | Shear, lbs. 2 days | Shear, lbs. 4 days |
|---|---|---|---|---|---|
| A | 15 | None | 4.8 | 1,100 | |
| A–1 | 15 | Alum | 4.4 | 1,700 | |
| A–1–B | 15 | Alum / HCOOH | 4.4 / 3.7 | 1,200 | 2,500 |
| A–1–C | 15 | Alum / HCOOH | 4.4 / 3.0 | 5,500 | 11,700 |
| A–1–D | 15 | Alum / HCl | 4.4 | 1,100 | 1,100 |
| A–1–E | 15 | Alum / HCl | 4.4 / 3.0 | 3,700 | 6,000 |
| A–2 | 15 | HCl | 4.2 | 2,700 | |
| A–3 | 15 | HCl | 3.6 | 500 | |
| A–4 | 15 | HCl | 3.0 | 14,600 | |
| B | 20 | None | 4.8 | 1,200 | |
| B–1 | 20 | Alum | 4.4 | 1,500 | |
| B–1–B | 20 | do | 4.4 | 1,100 | |
| B–1–C | 20 | Alum / HCOOH | 4.4 / 3.7 | 5,300 | 10,200 |
| B–1–D | 20 | Alum / HCl | 4.4 / 3.6 | 6,200 | 4,100 |
| B–1–E | 20 | Alum / HCl | 4.4 / 3.0 | | 8,800 |
| B–2 | 20 | HCl | 4.2 | 2,200 | |
| B–3 | 20 | HCl | 3.6 | 2,000 | |
| B–4 | 20 | HCl | 3.0 | 7,300 | |
| C | 7.5 | None | 4.8 | 600 | |
| C–1 | 7.5 | Alum | 4.4 | 1,100 | |
| C–2 | 7.5 | HCl | 4.2 | 2,400 | |
| C–3 | 7.5 | HCl | 3.6 | 900 | |
| Control [1] | | | | 3,300 | |

[1] Partially hydrolyzed polyvinyl acetate emulsion of approximately 50% solids content. A conventional assembly glue.

The foregoing data shows conclusively that a pH below 4.5 is required in order to cure the resin film as quickly as possible once it is spread on the wood. Further improvement in cure rate is noted when the pH of the solutions are lowered to the range of 2.0 to 2.8. The desired cure rate, however, must be balanced against solution viscosity. For example, when the pH of one of the above solutions having a B–C viscosity (at pH 3.8) is lowered to 1.4 by the addition of hydrochloric acid the viscosity declines to about A in one week after which it remains constant for six weeks or more. However, where extremely fast cure is desired the lower viscosity of the solution can be corrected by addition of 20% wheat flour just before using. The result is an easily spreadable paste. The pot-life of the wheat-extended paste is more than 10 to 12 hours.

*Example 2*

To demonstrate the stability of the three solutions of Example 1, each containing 10% methanol, based on the weight of heat-reacted solution, and respectively, 15, 20 and 7.5% excess formaldehyde, the various samples were stored for one year at room temperature and periodically checked for viscosity change. The sample of solution A (15% formaldehyde) containing no catalyst (pH 4.8) was stable for one year while all A solutions below 4.5 in pH showed a gradual increase in viscosity until gelation occurred in 10 to 12 months. For many industrial uses a stability of 10 months is more than adequate. All samples of solution B irrespective of pH were stable for a year or more without increase in viscosity. All samples of solution C (7.5% formaldehyde) were highly unstable, all samples being gelled in 3 months or less.

Those samples of solution C below 4.0 in pH were stable only a few days.

The above data demonstrates quite clearly that at least about 15% excess formaldehyde is required for adequate stabilization and that 20% is much better than 15%. Similar experiments show that very little improvement in solution stability is obtained by the use of more than 25% excess formaldehyde while with more than 40% the glue bond becomes unduly sensitive to water. When the amount of methanol is varied from 1 to 60%, based on the weight of heat-reacted solution, true stabilization is not achieved with less than about 5%, no further improvement is obtained above 25% and above 60% undesirable effects are obtained such as extremely low viscosities.

*Example 3*

Solutions similar to those of the preceding examples but stabilized with 10% methanol and 20% formaldehyde and catalyzed to a pH of 2.0 to 2.8 are utilized to glue maple blocks together. The solutions are applied using no open face assembly, 10 minutes open face and 15 minutes open face and pressed at 100 p. s. i. for one hour. The block assemblies are then tested in shear in comparison with several assembly adhesives believed to be based on polyvinyl acetate and/or its partially hydrolyzed derivatives. The results are as follows:

| Resin | 3 Days, Lbs. Shear | 2 Months, Lbs. Shear |
|---|---|---|
| Urea, no O. F. | 8,922 | 8,400 |
| Urea, 10″ O. F. | 10,283 | 9,600 |
| Urea, 15″ O. F. | 9,278 | 6,600 |
| Vinyl #1, no O. F. | 7,780 | 6,800 |
| Vinyl #2, no O. F. | 5,183 | 3,400 |

In order to determine the comparative rate at which the shear strength of the adhesive is developed, duplicate block-assemblies are tested at intervals in comparison with the vinyl resin glued assemblies. The tests show that the vinyl adhesive does not reach full strength until 5 hours after assembly. The urea adhesives of this invention, however, equal the vinyl strength in 6 or 7 hours and continue to develop additional strength for several days until they become 1,500 to 3,000 lbs. stronger.

*Example 4*

A urea resin solution of the invention stabilized with 15% methanol, 20% formaldehyde, and catalyzed to a pH of 3.0 with formic acid is plasticized by the addition of 10% glycerine. A small maple panel is painted with the solution, allowed to dry for 20 minutes and then given a second coat. A smooth, hard and glossy coating is obtained. The dried panel is then stored at 120° F. and low relative humidity. After six weeks at this temperature no cracking or crazing of the coating is observed, even under a six power microscope. When the cured coating is soaked in water or alcohol it is found to be completely resistant. Without the glycerine or ethylene glycol as a plasticizer the coating develops fine hair-like "crowsfeet" in about a week at room temperature. Similarly coated panels of beech, oak, walnut, show no cracking after three months of aging at room temperature. Thus, the solution is unique in that it is an air-drying varnish in water solution that dries in 20 to 30 minutes at room temperature to produce a water-, alcohol- and solvent-resistant coating.

The above plasticized urea resin solution is ground with sufficient pigment to form a thick paste. In a sealed container the paste is stable even when exposed to freezing temperatures. For use, it requires only thinning with water to a suitable viscosity for brush, roller or spray-gun application. When applied, the coating is a flat finish which dries to the touch in 15 to 30 minutes and becomes resistant to washing overnight. With the higher resin-to-pigment ratios semi-gloss water-base paints are obtained.

The pigmented or unpigmented, plasticized urea resin solutions of this invention can be utilized as a sealer for plaster walls, plaster of Paris molds and moldings, wood surfaces, etc. The coatings also are tightly adherent to glass, paper, fabric, and with a suitable primer, to metals.

While I have described in considerable detail certain preferred manners of practicing this invention, it is not intended or desired to be solely limited thereto, for as hitherto stated the procedure may be modified, the precise proportions of the materials utilized may be varied, and other materials having equivalent properties may be employed, if desired, without departing from the spirit and scope of the invention as defined in the appended claims.

I claim:

1. A stable, aqueous solution of a urea-formaldehyde resin, said solution containing from 35 to 75% total resin solids, having a pH below about 4.5 and comprising (1) an aqueous solution of a highly condensed, water-soluble, urea-formaldehyde resin having a mol ratio of formaldehyde to urea of from 1.5:1 to 2.5:1 and which has been heat reacted in the presence of a water-soluble amine, (2) from 5 to 60% by weight, based on the total weight of heat-reacted solution, of an added water-soluble, aliphatic, monohydric alcohol, (3) from 15 to 40% by weight, based on the total weight of resin, of added excess formaldehyde and (4) an acidic catalyst.

2. A stable, aqueous solution, containing from 35 to 75% total resin solids, comprising (1) an aqueous solution of a water-soluble, highly condensed, urea-formaldehyde resin having a mol ratio of formaldehyde to urea of from 1.5:1 to 2.5:1 and which has been heat reacted in the presence of an ethylene polyamine, (2) from 5 to 60% by weight, based on the total weight of heat-reacted solution, of an added water-soluble, aliphatic, monohydric alcohol, (3) from 15 to 40% by weight, based on the total weight of resin, of added excess formaldehyde, and (4) sufficient of an acidic substance to produce a pH in the range of 1.5 to 3.5; said acidic substance comprising an acidic catalyst.

3. A stable, aqueous, adhesive solution, containing from 35 to 75% total resin solids, comprising (1) an aqueous solution of a highly condensed, water-soluble, urea-formaldehyde resin having a mol ratio of formaldehyde to urea of from 1.5:1 to 2.5:1 and which has been heat reacted in the presence of 0.01 to 0.20 mol of diethylene triamine for every mol of urea therein, (2) from 5 to 25% by weight, based on the total weight of heat-reacted solution, of added methanol, (3) from 15 to 30% by weight, based on the total weight of resin, of added excess formaldehyde, and (4) sufficient of an acidic substance to produce a pH in the range of 2 to 2.8, said acidic substance comprising an acidic catalyst.

4. A stable, water-base, coating composition, containing from 35 to 75% total resin solids, comprising (1) an aqueous solution of a highly condensed, water-soluble, urea-formaldehyde resin having a mol ratio of formaldehyde to urea of from 1.5:1 to 2.5:1 and which has been heat reacted in the presence of 0.05 to 0.15 mol of a water-soluble amine for every mol of urea therein, (2) from 5 to 25% by weight, based on the total weight of heat-reacted solution, of added methanol, (3) from 15 to 30% by weight, based on the total weight of resin, of added excess formaldehyde, (4) sufficient of an acidic substance to produce a pH in the range of 1.5 to 3.5, said acidic substance comprising an acidic catalyst, and (5) a plasticizer for said urea resin.

5. A stable, aqueous adhesive, containing from 35 to 75% total resin solids, comprising (1) an aqueous solution of a highly condensed, water-soluble, urea-formaldehyde resin having a mol ratio of formaldehyde to urea of from 1.5:1 to 2.5:1 and which has been heat reacted during manufacture in the presence of 0.05 to 0.15 mol of diethylene triamine for every mol of area therein, (2) from 5 to 25% by weight, based on the total weight of heat-reacted solution, of added methanol, (3) from 15 to 30% by weight, based on the total weight of resin of added excess formaldehyde, (4) sufficient of an acidic substance to produce a pH in the range of 1.5 to 3.5, said acidic substance comprising an acidic catalyst, and (5) sufficient of a water-soluble thickener to produce a spreadable paste.

6. A method of stabilizing water-soluble, cationic, highly condensed, urea-formaldehyde resins having a mol ratio of formaldehyde to urea of from 1.5:1 to 2.5:1 and which have been heat reacted in the presence of a water-soluble amine, which comprises adding to an aqueous solution of such a resin from 5 to 60% by weight, based on the solution, of a water-soluble, aliphatic, monohydric alcohol and aqueous formaldehyde solution in such amount so as to constitute 15 to 40% excess formaldehyde by weight of the resin and then adding an acidic substance in sufficient amount to lower the pH of said solution below 4.5, said acidic substance comprising an acidic catalyst.

7. A method of preparing a stable, aqueous solution, containing from 35 to 75% total resin solids, of a urea-formaldehyde resin, which comprises (1) heat reacting formaldehyde and urea in the mol ratio of from 1.5:1 to 2.5:1, in the presence of a water-soluble amine, to an advanced degree of condensation as indicated by a viscosity thereof of from 5.0 to 47.0 poises, (2) adding to the highly condensed resin solution (a) from 5 to 60% by weight, based on the total weight of heat-reacted solution, of a water-soluble, aliphatic, monohydric alcohol, (b) from 15 to 40% by weight, based on the total weight of resin, of excess formaldehyde, and (3) adjusting the pH of the final solution below about 4.5 with the use of an acidic substance that comprises an acidic catalyst.

8. A method of preparing a stable, aqueous solution containing from 35 to 75% total resin solids which comprises (1) heat reacting formaldehyde and urea in the mol ratio of from 1.5:1 to 2.5:1, in the presence of an ethylene polyamine, to an advanced degree of condensation as indicated by a viscosity thereof of from 5.0 to 47.0 poises, (2) adding to the highly condensed, resin solution (a) from 5 to 60% by weight, based on the total weight of heat-reacted solution, of a water-soluble, aliphatic, monohydric alcohol, (b) from 15 to 40% by weight, based on the total weight of resin, of excess formaldehyde, (c) sufficient of an acidic substance to produce a pH in the range of 1.5 to 3.5, said acidic substance comprising an acidic catalyst.

9. A method of preparing a stable, aqueous, adhesive solution containing from 35 to 75% total resin solids which comprises (1) heat reacting formaldehyde and urea in the mol ratio of from 1.5:1 to 2.5:1, in the presence of 0.01 to 0.20 mol of diethylene triamine for every mol of urea, to an advanced degree of condensation as indicated by a viscosity thereof of from 5.0 to 47.0 poises, (2) adding to the highly condensed resin solution (a) from 5 to 25% by weight, based on the total weight of heat-reacted solution, of methanol, (b) from 15 to 30% by weight, based on the total weight of resin, of excess formaldehyde, and (c) sufficient of an acidic substance to produce a pH in the range of 2.0 to 2.8, said acidic substance comprising an acidic catalyst.

10. A method of preparing a stable, water-base, coating composition containing from 35 to 75% total resin solids which comprises (1) heat reacting formaldehyde and urea in the mol ratio of from 1.5:1 to 2.5:1, in the presence of 0.05 to 0.15 mol of a water-soluble amine for every mol of urea, to an advanced degree of condensation as indicated by a viscosity thereof of from 5.0 to 47.0 poises, (2) adding to the highly condensed resin solution (a) from 5 to 25% by weight, based on the total weight of heat-reacted solution, of methanol, (b) from 15 to 30% by weight, based on the total weight of resin, of excess formaldehyde, (c) sufficient of an acidic substance to produce a pH in the range of 1.5 to 3.5, said acidic substance comprising an acidic catalyst, and (d) a plasticizer for said urea resin.

11. A method of preparing a stable, adhesive containing from 35 to 75% total resin solids which comprises (1) heat reacting formaldehyde and urea in the mol ratio of from 1.5:1 to 2.5:1, in the presence of 0.05 to 0.15 mol of diethylene triamine for every mol of urea, to an advanced degree of condensation as indicated by a viscosity thereof of from 5.0 to 47.0 poises, (2) adding to the highly condensed resin solution (a) from 5 to 25% by weight, based on the total weight of heat-reacted solution, of methanol, (b) from 15 to 30% by weight, based on the total weight of resin, of excess formaldehyde, (c) sufficient of an acidic substance to produce a pH in the range of 1.5 to 3.5, said acidic substance comprising an acidic catalyst, and (d) sufficient of a water-soluble thickener to produce a spreadable paste.

References Cited in the file of this patent

UNITED STATES PATENTS

| | | |
|---|---|---|
| 2,085,492 | Ellis | June 29, 1937 |
| 2,334,097 | Howald | Nov. 9, 1943 |
| 2,341,266 | D'Alelio | Feb. 8, 1944 |
| 2,430,950 | Rothrock | Nov. 18, 1947 |
| 2,586,188 | Van Wirt et al. | Feb. 19, 1952 |
| 2,626,251 | James et al. | Jan. 20, 1953 |